United States Patent
Fried

[15] 3,681,391
[45] Aug. 1, 1972

[54] 1,6 OXIDOCYCLODECAPENTAENE ALCOHOLS, ALDEHYDES, AND ACIDS

[72] Inventor: John H. Fried, Palo Alto, Calif.

[73] Assignee: Syntex Corporation, Panama, Panama

[22] Filed: Sept. 9, 1970

[21] Appl. No.: 70,903

Related U.S. Application Data

[63] Continuation-in-part of Ser. No. 742,140, July 3, 1968, abandoned.

[52] U.S. Cl............260/333, 260/348 C, 260/345.9, 260/347.8, 260/999, 260/514, 260/611 F, 260/617 F
[51] Int. Cl...............................................C07d 9/00
[58] Field of Search.....................................260/333

Primary Examiner—Norma S. Milestone
Attorney—Evelyn K. Merker and Walter H. Dreger

[57] ABSTRACT

Novel 1,6-oxidocyclodecapentaene alcohols, aldehydes, and acids and derivatives having anti-inflammatory and fibrinolytic activity.

10 Claims, No Drawings

1,6 OXIDOCYCLODECAPENTAENE ALCOHOLS, ALDEHYDES, AND ACIDS

This is a continuation-in-part of patent application, Ser. No. 742,140, filed July 3, 1968 and now abandoned.

This invention relates to novel cyclodecapentaene compounds of the following Formulas (A) and (B):

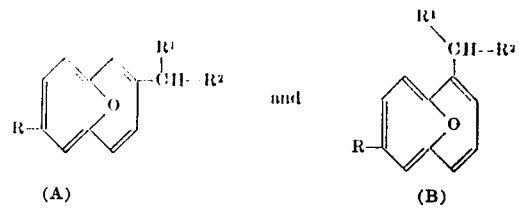

wherein,

R is hydrogen, lower alkyl, lower monocyclic alkyl, or lower alkoxy;

$R^1$ is hydrogen or alkyl of one to three carbon atoms; and $R^2$ is —CHO, —$CH_2$-$R^3$, —$COOR^4$, —$CONH_2$ or —CONHOH, in which $R^3$ is hydroxy or the hydrolyzable esters and ethers thereof and $R^4$ is hydrogen, lower alkyl or an alkali metal.

The term "lower alkyl," unless otherwise specified, refers to a straight or branched saturated acyclic aliphatic hydrocarbon group containing from one to six carbon atoms and 1 and 2 ... and 6 and 1 to 2 ... to six carbon atoms, methyl, ethyl, propyl, butyl, pentyl, and hexyl, the various isomers thereof. The term "lower alkoxy" refers to the group "lower alkylO," "lower alkyl" being as defined above. "Lower monocyclic alkyl" contains three to six carbon atoms, cyclopropyl, cyclobutyl, and cyclohexyl. The expression "hydrolyzable esters and ethers," as used herein, refers to those physiologically acceptable hydrolyzable ester groups and labile ether groups conventionally employed in the pharmaceutical art such as acetate, propionate, butyrate, trimethylacetate, valerate, methylethylacetate, caproate, t-butylacetate, 3-methylpentanoate, enanthate, caprylate, triethylacetate, pelargonate, decanoate, undecanoate, benzoate, phenylacetate, diphenylacetate, cyclopentylpropionate, methoxyacetate, aminoacetate, diethylaminoacetate, trichloroacetate, β-chloropropionate, bicyclo[2.2.2]octane-1'-carboxylate, adamantoate, dihydrogen phosphate, dibenzyl phosphate, sodium ethyl phosphate, sodium sulfate, sulfate, tetrahydropyran-2'-yl ether, tetrahydrofuran-2'-yl ether, 4'-methoxytetrahydropyran-4'-yl ether, and the like.

The compounds of formula A of the present invention wherein R is hydrogen, lower alkyl, or lower monocyclic alkyl, are prepared according to the following outlined procedure:

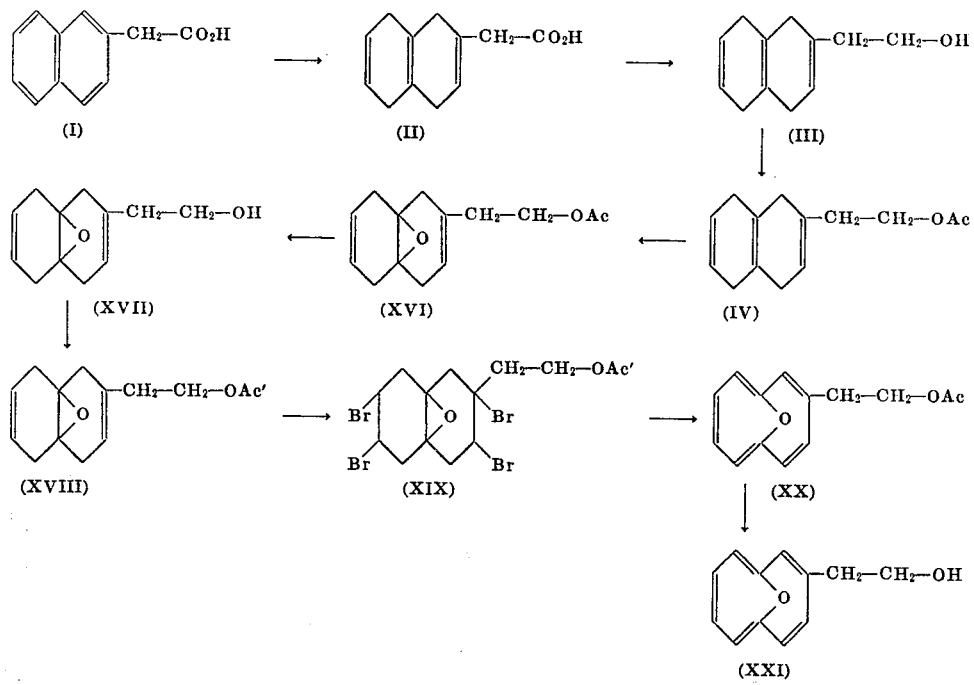

In the above formulas, Ac is an acyl group e.g. a lower carboxylic acyl such as acetyl and Ac' is trimethylacetyl.

In carrying out the procedures outlined above, 2-naphthylacetic acid (I) is reduced to 1,4,5,8-tetrahydro-2-naphthylacetic acid (II) by treatment with an alkali metal such as sodium, potassium or lithium in liquid ammonia in the presence of a lower alcohol such as ethanol, t-butanol, and the like. The acid (II) is treated with a reducing agent such as lithium aluminum hydride to afford 2-(1',4',5',8'2'-naphthyl)ethanol (III). The conversion of (II) to (III) can also be carried out by first preparing the corresponding alkyl ester of (II), e.g. by treating (II) with diazomethane in ether to obtain the methyl ester of (II), and then reacting the alkyl ester of (II) with lithium aluminum hydride to obtain the alcohol (III). The alcohol (III) is next esterified in a conventional manner, e.g. by treatment with a carboxylic anhydride such as acetic anhydride in pyridine, to obtain the carboxylic ester (IV). The 9',10'-oxido (XVI) is prepared by treating the 1',4',5',8'-tetrahydroderivative (IV) with a peracid such as perbenzoic acid, perphthalic acid or m-chloroperbenzoic acid in an organic solvent inert to the reaction such as methylene chloride, carbon tetrachloride or hexane. Compound (XVI) is hydrolyzed by treatment with base, e.g. potassium bicarbonate or sodium bicarbonate, in an aqueous lower alcohol such as methanol to obtain 2-(9',10'-oxido-1',4',5',8',9',10'-hexahydro-2'-naphthyl)ethanol (XVII). The alcohol (XVII) is treated with trimethylacetyl chloride in pyridine to obtain the corresponding trimethylacetate (XVIII) which is converted into the corresponding 2',3',6',7'-tetrabromodecahydro derivative (XIX) by treatment with bromine. The tetrabromodecahydro derivative

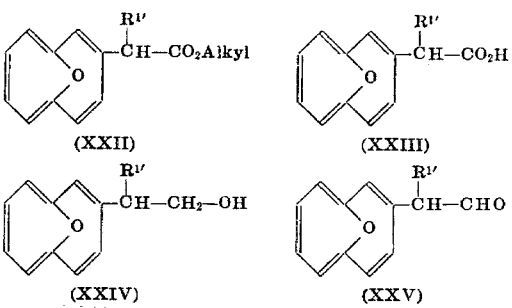

In the above, $R^1$ is alkyl and alkyl is lower alkyl.

The novel compounds of the present invention of formula A wherein R is lower alkoxy are obtained according to the following outlined procedure.

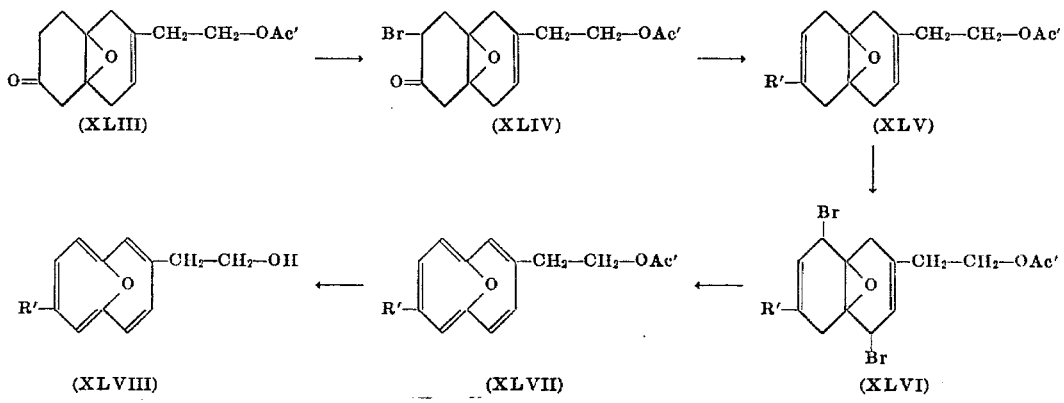

(XIX) is then treated with potassium t-butoxide to afford the trimethylacetate of 2-(1',6'-oxidocyclodecapentaen-3'-yl) ethanol (XX) which is subjected to hydrolysis by treatment with base, e.g. sodium carbonate, or sodium or potassium hydroxide, in aqueous methanol to afford the free alcohol (XXI). The alcohol (XXI) is oxidized using, e.g. N,N'-dicyclohexylcarbodiimide in dimethyl sulfoxide, to furnish the corresponding aldehyde, i.e. 2-(1',6'-oxidocyclodecapentaen-3'-yl)ethanal which can also be named 1,6-oxidocyclodecapentaen-3-ylacetaldehyde. The acid after being prepared as described above, can be treated with a diazoalkane to prepare the corresponding lower alkyl ester.

Novel derivatives of the acids having a lower alkyl group on the alpha carbon atom are obtained by alkylation of a lower alkyl ester of an acid followed by hydrolysis of the ester to the free acids. The alkylation can be carried out by treating an alkyl ester of the acid with an alkali metal hydride such as sodium hydride and a lower alkyl iodide in an organic solvent such as the ethers, e.g. 1,2-dimethoxyethane to afford compounds of formula (XXII) and thereafter removing the ester group by treatment with base, e.g. an alkali metal hydroxide or carbonate, in a lower alcohol such as methanol to afford the free acid (XXIII).

A compound of either formula (XXII) or (XXIII) can be reduced using, e.g. lithium aluminum hydride in tetrahydrofuran, to afford the corresponding alcohol (XXIV) which is oxidized using one of the procedures described above to afford the aldehyde (XXV).

In the above formulas, Ac' is trimethylacetyl and R' is lower alkoxy. In the practice of the above process, 2-(6'-methoxy-1',4',5',8'-tetrahydro-2'-naphthyl)ethanol (prepared by reducing 6-methoxy-2-naphthylacetic acid or 2-(6'-methoxy-2'-naphthyl)ethanol using the methods described above) is treated with acid, e.g. oxalic acid, acetic acid, or the like, to obtain 2-(6'-oxo-1',4',5',6',7',8'-hexahydro-2'-naphthyl)ethanol. Compound (XLIII), the trimethylacetate 2-(6'-oxo-9',10'-oxido-1',4',5',6',7',8',9',10'-octahydro-2'-naphthyl)ethanol is prepared therefrom as described above and is then treated with cupric bromide to obtain the corresponding 7-bromo compound (XLIV) which is treated with zinc powder in an ether solvent such as tetrahydrofuran to form the zinc enolate thereof followed by treatment with a di(lower)alkyl sulfate of up to about six carbon atoms, e.g. dimethyl sulfate, diethyl sulfate, dipropyl sulfate, and the like, to form the corresponding enol ether (XLV) as 1,4,5,8-tetrahydro and/or 1,4,7,8-tetrahydro isomers, e.g. the trimethylacetate of 2-(6'-methoxy-9',10'A-oxido-1',4',5',8',9',10'-hexahydro-2'-naphthyl)ethanol. In this method an enol ether (XLV) is then converted into the corresponding 4',8'-dibromo compound (XLVI) by treatment with a brominating agent such as N-bromosuccinimide in carbon tetrachloride, or the like. A 4',8'-dibromo derivative (XLVI), e.g. the trimethylacetate of 2'-(6'-methoxy-4',8'-dibromo-9',10'-oxido-1',4',5',8',9',10'-hexahydro-2'-naphthyl)ethanol, is then treated with an alkali alkoxide, e.g. potassium t-butoxide, to afford a cyclodecapentaene (XLVII), e.g. the trimethylacetate of 2-(8'-methoxy-1',6'-oxido-cyclodecapentaen-3'-yl)ethanol which is hydrolyzed by treatment with base, e.g. potassium hydroxide, in an aqueous lower alcohol, e.g. methanol, to afford the free alcohol (XLVIII), e.g. 2'-(8'-methoxy-1',6'-oxidocyclodecapentaen-3'-yl)ethanol. The alcohol (XLVIII) is converted into the corresponding aldehyde (XLIX) and acid (L) by oxidation using, e.g. N,N'-dicyclohexylcarbodiimide in dimethyl sulfoxide; silver oxide, and the like.

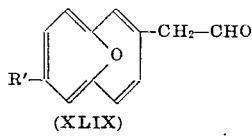
(XLIX)

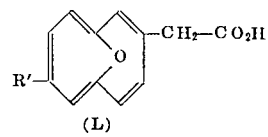
(L)

Using the alkylation methods described herein, the compounds of formulas (XLVIII), (XLIX), and (L) are converted into the corresponding alkylated derivatives of the following formula wherein R', $R^1$ are defined above and $R^3$ is hydroxymethyl, formyl, or carboxy.

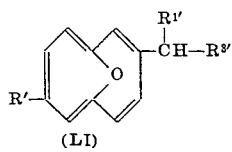
(LI)

The process described herein for the preparation of compounds of formula A are also applicable to the preparation of the compounds of formula B using as the starting material the corresponding C-1 substituted naphthalene compounds, e.g. 1-naphthylacetic acid and 6-methoxy-1-naphthylacetic acid in place of 2-naphthylacetic acid and 6-methoxy-2-naphthylacetic acid, respectively.

Compounds of the present invention of formulas A and B wherein $R^2$ is —$CH_2$-$R^3$ in which $R^3$ is hydroxy can be esterified and etherified to obtain the corresponding hydrolyzable esters and ethers. Esterification can be carried out, for example, by treating the free hydroxy compound with a carboxylic acid anhydride or carboxylic acid halide in pyridine or the like to obtain esters of organic acids. Esters of inorganic acids such as the sulfates can be prepared by treating the free hydroxy compound with a sulfur trioxide trimethylamine complex in pyridine or by procedures such as described by Kornel et al., Steroids 4, 67 (1964); Kirdani, Steroids 6, 845 (1965) and Bernstein, Steroids 7, 577 (1966). Phosphate esters can be prepared from the free hydroxy compounds by treatment with, e.g., β-cyanoethylphosphate in the presence of N,N'-dicyclohexylcarbodiimide in pyridine or by the method of Wendler, Chem. & Ind., 1174 (1967) or U.S. Pat. Nos. 2,936,313, 3,248,408, or 3,254,100. Alkali metal salts of the esters can be made by treatment with base, e.g. sodium ethylate, sodium or potassium bicarbonate, and the like. By controlling the amount of base, both the mono and di salts can be obtained.

By treatment of a free alcohol of formulas A and B with dihydropyran or dihydrofuran in the presence of mild acid catalyst, tetrahydropyranyl and tetrahydrofuranyl ethers are obtained. Tetrahydropyranyl ethers and tetrahydrofuranyl ethers can also be prepared by reacting the free alcohol with about a molar equivalent of 2-benzoyloxytetrahydropyran and 2-benzoyloxytetrahydrofuran, respectively, in an inert organic solvent under substantially neutral conditions. The 4'-methoxytetrahydropyran-4'-yl ethers are obtained by reacting the free alcohol with an excess of 4-methoxy-5,6-dihydro-2H-pyran in the presence of a small amount of a mild acid catalyst at about room temperature.

Compounds of formulas A and B wherein $R^2$ is —$COOR^4$ in which $R^4$ is alkali metal can be prepared by treating the corresponding free acid with an aqueous solution of a base such as sodium or potassium bicarbonate or by titrating with an alcohol solution of an alkali metal alkoxide such as sodium methoxide, potassium methoxide, and the like. The novel lower alkyl acid esters of the present invention can be obtained by treating a free acid of formulas A and B with ethereal diazoalkane. They can also be prepared by treating an alkali metal salt of the acid with a lower alkyl iodide or bromide in dimethylacetamide, or the like.

Acid amides of formulas A and B ($R^2$ is —$CONH_2$) are prepared, for example, by treating an acid of formulas A and B with thionyl chloride followed by treatment with anhydrous ammonia.

By treating an acid of formulas A and B with hydroxylamine hydrochloride in the presence of sodium methoxide, the novel hydroxamic acids of formulas A and B ($R^2$ is —CONHOH) are obtained.

The compounds of the present invention exhibit geometrical isomerism due to chirality of the bridgehead in the annulene ring system. In addition, those compounds having an asymmetric carbon atom, i.e., those wherein $R^1$ is other than hydrogen are optically active. Each of the isomers resulting from asymmetric carbon atoms and/or chirality, and mixtures thereof, are included within the scope hereof. These isomers can be separated by conventional means such as by forming salts of the acids with active amines such as brucine, cinchonine, methylamine, morphine, quinidine, quinine, strychnine, or the like, and thereafter separating the diasteriomeric salts by fractional crystallization followed by regeneration of the free acid.

The compounds of the present invention of formulas A and B are therapeutically useful anti-inflammatory agents, analgesic agents, and anti-pyretic agents. Thus, they are useful for the treatment of inflammatory conditions of the skin, bones, and muscles and pain associated therewith such as contact dermatitis, bursitus, arthritis, pruritus, and the like. They can be administered and used in the same way as phenylbutazone. For example, they can be administered orally to animals such as cats, dogs, horses, and the like, for the treatment of painful arthritic and skeletal muscular disorders. They are also useful 1) hypocholesteroemic and 2) fibrinolytic agents. They are thus useful for 1) lowering serum cholesterol levels and 2) the treatment of thromboembolic conditions by lysing performed fibrin. They can be administered and used in the same way as agents possessing like activity such as 1) various sterols and 2) actase or thrombolysin.

The following examples are provided to illustrate the practice of the present invention.

EXAMPLE 1

A solution of 10 g. of 2-naphthylacetic acid in 100 ml. of ethanol:ether (1:1) is added to 15 g. of sodium in 500 ml. of liquid ammonia at —78°. After about one hour, excess sodium is destroyed by the addition of ammonium chloride and about 50 ml. of water is added. The reaction mixture is then allowed to rise to room temperature and then about 200 ml. of water followed by about 400 ml. of ether is added. The ether layer is separated, washed, dried over magnesium sulfate and evaporated to give 1,4,5,8-tetrahydro-2-naphthylacetic acid which can be purified by recrystallization from aqueous methanol.

By repeating the above procedure using 2-(6'-methoxy-2'-naphthyl)ethanol as the starting material, there is obtained 2-(6'-methoxy-1',4',5',8'-tetrahydro-2'-naphthyl)ethanol.

EXAMPLE 2

A. A solution of 1 g. of 1,4,5,8-tetrahydro-2-naphthylacetic acid in dry tetrahydrofuran is refluxed for about 48 hours with a molar excess of lithium aluminum hydride. The reaction mixture is diluted with water and ethyl acetate. The ethyl acetate layer is separated, washed, dried and evaporated to give 2-(1',4',5',8'2'-naphthyl)ethanol.

B. A mixture of 1 g. of the above compound, 4 ml. of pyridine and 4 ml. of acetic anhydride is allowed to stand at room temperature for 15 hours. The mixture is then poured into water and extracted several times with ethyl acetate. The ethyl acetate extracts are combined, washed with dilute hydrochloric acid and water, dried and evaporated to give the acetate of 2-(1',4',5',8'-tetrahydro-2'-naphthyl)ethanol.

The procedure of Part A above is repeated using 6-methoxy-2-naphthylacetic acid as the starting material and there is obtained 2-(6'-methoxy-2'-naphthyl)ethanol.

As an alternative to the procedure of Part A of this example, prior to reduction, the acid can be converted into the methyl ester as by treatment with diazomethane or the like, and the thus-obtained methyl ester then converted into the alcohol by treatment with lithium aluminum hydride at about room temperature for about 2 hours.

EXAMPLE 3

A. A solution of 20 g. of meta-chloroperbenzoic acid (75 percent) in 300 ml. of methylene chloride is added slowly to 1 equivalent of the acetate of 2-(1',4',5',8'-tetrahydro-2'-naphthyl)ethanol in about 400 ml. of methylene chloride at −78° over a period of about 1 hour. After addition is complete, the reaction mixture is allowed to warm to room temperature. The reaction mixture is then washed with water, dried and evaporated to give the acetate of 2-(9',10'-oxido-1',4',5',8'<¼,9',10'-hexahydro-2'-naphthyl)ethanol.

B. One gram of the above acetate is allowed to stand at room temperature for 15 hours with 1 g. of potassium bicarbonate in 10 ml. of water and 90 ml. of methanol. At the end of this time, the methanol is evaporated under reduced pressure and the residue is extracted with ethyl acetate and water. Evaporation of the ethyl acetate from these extracts yields 2-(9',10'-oxido-1',4',5',8',9',10'-hexahydro-2'-naphthyl)ethanol which is crystallized from acetone:hexane.

EXAMPLE 4

A mixture of 1 g. of 2-(9',10'-oxido-1',4',5',8',9',10'-hexahydro-2'-naphthyl)ethanol, 4 ml. of pyridine and 2 ml. of trimethylacetyl chloride is allowed to stand at room temperature for 15 hours. The mixture is then poured into water and extracted with methylene chloride. The methylene chloride extracts are combined, washed, dried and evaporated to give the trimethylacetate of 2-(9',10'-oxido-1',4',5',8',9',10'-hexahydro-2'-naphthyl)ethanol.

EXAMPLE 5

To a solution of 1 g. of the trimethylacetate of 2-(9',10'-oxido-1',4',5',8',9',10'-hexahydro-2'-naphthyl)ethanol in 100 ml. of carbon tetrachloride containing a trace of pyridine, there is added 2 molar equivalents of bromine in 50 ml. of carbon tetrachloride. The reaction mixture is allowed to stand at room temperature for about 20 hours. The reaction mixture is washed, dried and evaporated to give the trimethylacetate of 2'-(9',10'-oxido-2',3',6',7'-tetrabromodecahydro-2'-naphthyl)ethanol.

One gram of the above trimethylacetate of 2'-(9',10'-oxido-2',3',6',7'-tetrabromodecahydro-2'-naphthyl)ethanol is dissolved in 15 ml. of dry tetrahydrofuran and then about 4 g. of potassium t-butoxide is added. The reaction mixture is stirred for about 3 hours and then it is diluted with water and ether. The ether layer is separated, washed, dried and evaporated to give trimethylacetate of 2-(1',6'-oxidocyclo-decapentaen-3'-yl)ethanol.

EXAMPLE 6

A. A mixture of 1 g. of the trimethylacetate of 2-(1',6'-oxidocyclodecapentaen-3'-yl)ethanol in 60 ml. of methanol is treated with a solution of 0.5 g. of potassium hydroxide in 3 ml. of water. The mixture is heated at reflux for 1 hour and then cooled, diluted with water and extracted with methylene chloride. The methylene chloride extracts are combined, washed, dried and evaporated to give 2-(1',6'-oxidocyclodecapentaen-3'-yl)ethanol.

B. To a substantially anhydrous solution of 1 g. of 2-(1',6'-oxidocyclodecapentaen-3'-yl)ethanol in 50 ml. of dimethylsulfoxide, there is added 0.5 molar equivalents of anhydrous orthophosphoric acid and 5 molar equivalents of anhydrous N,N'-dicyclohexylcarbodiimide. The reaction mixture is allowed to stand at room temperature for about 30 minutes. The reaction mixture is then concentrated by evaporation under vacuum and taken up in petroleum ether. This mixture is washed, dried and evaporated to give 2-(1',6'-oxido-cyclodecapentaen-3'-yl)ethanal [1,6'-oxido-cyclodecapentaen-3-ylacetaldehyde].

By subjecting the above aldehyde to oxidation using silver oxide, the corresponding acid is obtained, i.e. 1,6-oxidocyclodecapentaen-3-ylacetic acid.

EXAMPLE 7

A mixture of 1 g. of the 1,6-oxidocyclodecapentaen-3-yl-acetic acid, 3 ml. of methyl iodide and 20 ml. of dimethylacetamide is stirred in the dark for 5 hours. Excess methyl iodide is removed by evaporation under reduced pressure. The mixture is then poured into water and extracted several times with ether. The ether extracts are combined, washed, dried and evaporated to give the methyl ester of 1,6-oxidocyclodecapentaen-3-ylacetic acid.

By using other lower alkyl iodides in place of methyl iodide in the above procedure, the corresponding lower alkyl esters are obtained.

Alternatively, the free acids can be converted into lower alkyl esters by treatment with a lower diazoalkane such as diazomethane, diazoethane, and the like, in ether for a few hours.

EXAMPLE 8

To a mixture of 22 g. of the methyl ester of 1,6-oxidocyclodecapentaen-3-ylacetic acid, 2.5 g. of sodium hydride and 150 ml. of 1,2-dimethoxyethane, there is added 25 g. of methyl iodide. The reaction mixture is allowed to stand for several hours and is then diluted with ethanol and water. The mixture is then extracted with methylene chloride. The methylene chloride extracts are combined, washed, dried and evaporated to give the methyl ester of 2-(1',6'-oxidocyclodecapentaen-3'-yl)propionic acid.

EXAMPLE 9

A mixture of 25 g. of the methyl ester of 1,6-oxidocyclodecapentaen-3-ylacetic acid, 15 g. of sodium carbonate, 200 ml. of methanol and 24 ml. of water is allowed to stand for 24 hours. The reaction mixture is neutralized by the addition of dilute HCl and then extracted with methylene chloride. The methylene chloride extracts are combined, washed, dried and evaporated to give 2-(1',6'-oxidocyclodecapentaen-3'-yl)propionic acid.

EXAMPLE 10

A mixture of 2 g. of 2-(6'-methoxy-1',4',5',8'-tetrahydro-2'-naphthyl)ethanol and 35 ml. of methanol is heated to reflux and 3.5 ml. of acetic acid added. This mixture is refluxed for about 15 minutes and then allowed to cool. The mixture is then diluted with water and extracted with methylene chloride. The methylene chloride extracts are combined and then washed, dried and evaporated to give 2'-(6'-oxo-9',10'-oxido-1',4',5',6',7',8',9',10'-octa-hydro-2'-naphthyl)ethanol the procedure of Example 3, Part A which is converted into the trimethylacetate of 2'-(6'-oxo-9',10'-oxido-1',4',5',6',7',8',9',10'-octahydro-2'-naphthyl)ethanol using the procedure of Example 4.

EXAMPLE 11

A mixture of 2.0 g. of the trimethylacetate of 2-(6'-oxo-9',10'-oxido-1',4',5',6',7',8',9',10'B-octahydro-2'-naphthyl)ethanol, 2.3 g. of cupric bromide and 200 ml. of methanol is refluxed for 24 hours. The reaction mixture is poured into water and the resulting mixture extracted with chloroform. The organic extracts are dried over magnesium sulfate and evaporated. The residue is chromatographed on silica gel to give the trimethylacetate of 2-(6'-oxo-7'-bromo-9',10'-oxido-1',4',5',6',7',8',9',10'-octahydro-2'-naphthyl)ethanol.

EXAMPLE 12

A mixture of 3 g. of the trimethylacetate of 2-(6'-oxo-7'-bromo-9',10'-oxido-1',4',5',6',7',8',9',10'-octahydro-2'-naphthyl)ethanol, about 2 equivalents of zinc powder and 200 ml. of dry tetrahydrofuran is stirred for about two hours at 50°–60°. Stirring is continued until formation of zinc enolate is complete as checked by thin layer chromatography. The mixture is allowed to stand and cool and then decanted under anhydrous conditions. To the thus-obtained solution, there is added about 50 ml. of dimethyl sulfate and the mixture stirred. The reaction mixture is then allowed to stand at room temperature until formation of the enol ether is complete as checked by thin layer chromatography. The reaction mixture is then poured into water. This mixture is extracted with methylene chloride. The methylene chloride extracts are washed, dried and evaporated to give the trimethylacetate of 2-(6'-methoxy-9',10'-oxido-1',4',5',8',9',10'-hexahydro-2'-naphthyl)ethanol.

EXAMPLE 13

A mixture of 2 g. of the trimethylacetate of 2-(6'-methoxy-9',10'-oxido-1',4',5',8',9',10'-hexahydro-2'-naphthyl)ethanol and 2 equivalents of N-bromosuccinimide in 50 ml. of carbon tetrachloride is refluxed for about 1 hour. The mixture is then filtered and evaporated to dryness under reduced pressure to yield the trimethylacetate of 2-(6'-methoxy-4',8'-dibromo-9',10'A-oxido-1',4',5',8',9',10'-hexahydro-2'-naphthyl)ethanol which is treated with potassium t-butoxide according to the procedure of Example 5 to give the trimethylacetate of 2-(8'-methoxy-1',6'-oxidocyclodecapentaen-3'-yl)ethanol.

By use of the procedure of Example 6, the trimethylacetate of 2-(8'-methoxy-1',6'-oxidocyclodecapentaen-3'-yl)ethanol is hydrolyzed and then oxidized to give 2-(8'-methoxy-1',6'-oxidocyclodecapentaen-3'-yl)ethanol, 2-(8'-methoxy-1',6'-oxidocyclodecapentaen-3'-yl)ethanol and 8-methoxy-1,6-oxidocyclodecapentaen-3-ylacetic acid, respectively.

EXAMPLE 14

A mixture of 1 g. of the 8-methoxy-1,6-oxidocyclodecapentaen-3-ylacetic acid, 3 ml. of methyliodide and 20 ml. of dimethylacetamide is stirred in the dark for 5 hours. Excess methyl iodide is removed by evaporation under reduced pressure. The mixture is then poured into water and extracted several times with ether. The ether extracts are combined, washed, dried and evaporated to give the methyl ester of 8-methoxy-1,6-oxidocyclodecapentaen-3-ylacetic acid.

The thus-obtained methyl ester is alkylated using the procedure of Example 8 and then hydrolyzed using the procedure of Example 9 to afford the 2-(8'-methoxy-1',6'3'-yl)propionic acid.

EXAMPLE 15

By subjecting 2-(6'-oxo-1',4',5',6',7',8'-hexahydro-1'-naphthyl)propanol to the procedure of Example 4 the corresponding trimethylacetate is obtained which is treated with metachloroperbenzoic acid according to the procedure of Example 3 (Part A) to give the trimethylacetate of 2-(6'-oxo-9',10'-oxido-1',4',5',6',7',8',9',10'B-octahydro-1'-naphthyl)propanol. compound is treated with cupric bromide using the procedure of Example 11 to give the corresponding 7-bromo compound which is converted into the trimethylacetate of 2-(6'-methoxy-9',10'-oxido-1',4',5',8',9',10'-hexahydro-1'-naphthyl)propanol using the procedure of Example 12. Following the procedure of Example 13 using the trimethylacetate of 2-(6'-methoxy-9',10'-oxido-1',4',5',8',9',10'-hexahydro-1'-naphthyl)propanol as the starting material, there is obtained the trimethylacetate of 2-(6'-methoxy-4',8'-dibromo-9',10'-oxido-1',4',5',8',9',10'-hexahydro-1'-naphthyl)propanol, the trimethylacetate of 2-(8'-methoxy-1',6'-oxidocyclodecapentaen-2'-yl)propanol, 2-(8'1',6'-oxidocyclodecapentaen-2'- yl)propanol, 2-(8'-methoxy-1',6'-oxidocyclodecapentaen-2'-yl)propanal and 2-(8'-methoxy-1',6'oxidocyclodecapentaen-2'-yl)propionic acid, respectively.

Similarly, by use of the procedure of Example 2 (Part A), 2-(6'-methoxy-1'-naphthyl)ethanol can be prepared from 6-methoxy-1-naphthylacetic acid.

EXAMPLE 16

The process of Example 1 is repeated using 1-naphthylacetic acid as the starting material and there is obtained 1,4,5,8-tetrahydro-1-naphthylacetic acid which is converted into the acetate of 2-(1',4',5',8'-tetrahydro-1'-naphthyl)ethanol by the procedure of Example 2. This compound is processed according to the methods of Example 3 to give the acetate of 2-(9',10'-oxido-1',4',5',8',9',10'-hexahydro-1'-naphthyl)ethanol. The process of Examples 4 and 5 are then repeated using as the starting material 2-(9',10'-oxido-1',4',5',8',9',10'-hexahydro-1'-naphthyl)ethanol and there is obtained as the final product, the trimethylacetate of 2-(1',6'-oxidocyclodecapentaen-2'-yl)-ethanol which can be treated according to the procedure of Example 6 to obtain the corresponding free alcohol, aldehyde and acid, i.e. 2-(1',6'-oxidocyclodecapentaen-2'-yl)ethanol, 2-(1',6'-oxidocyclodecapentaen-2'-yl)ethanol and 1,6-oxidocyclodecapentaen-2-ylacetic acid.

By repeating this example using 2-(1'-naphthyl)propionic acid as the starting material, there is obtained as final products, 2-(1',6'-oxidocyclodecapentaen-2'-yl)propanol, 2-(1',6'-oxidocyclodecapentaen-2'-yl)propanol and 2-(1',6'-oxidocyclo-decapentaen-2'-yl)propionic acid. Alternatively, these propanol, propanal, and propionic acid compounds can be prepared by alkylation of the corresponding alkyl ester of 1,6-oxidocyclodecapentaen-2-ylacetic acid using the procedure of Example 8 and thereafter hydrolyzing to obtain the free acid and reducing the free acid or alkyl ester (see Example 2) to obtain the alcohol which can then be oxidized to the aldehyde using, e.g. chromium trioxide in pyridine.

EXAMPLE 17

A solution of 1 g. of 2-(8'-methoxy-1',6'-oxidocyclodecapentaen-3'-yl)propionic acid, 2 ml. of thionyl chloride in 20 ml. of benzene is held at reflux for about 2 hours. The reaction mixture is cooled and evaporated. The residue is dissolved in anhydrous dioxane and the solution saturated with a stream of anhydrous ammonia. Water is then added after about 20 hours and the mixture evaporated under reduced pressure. The residue is taken up in methylene chloride, washed with water, dried and evaporated to give 2-(8'-methoxy-1',6'-oxidocyclodecapentaen-3'-yl)propionic acid amide.

EXAMPLE 18

A mixture of 1 g. of 2-(8'-methoxy-1',6'-oxidocyclodecapentaen-3'-yl)propanol, 3 ml. of pyridine and 3 ml. of acetic anhydride is allowed to stand at room temperature for about 15 hours. The mixture is then poured into water and extracted with ethyl acetate. The ethyl acetate extracts are combined; washed with dilute hydrochloric acid and water, dried and evaporated to give the acetate of 2-(8'-methoxy-1',6'3'-yl)propanol.

Similarly, by using an equivalent amount of other lower carboxylic anhydrides such as propionic anhydride, n-butyric anhydride, n-caproic anhydride, trimethylacetic anhydride, trichloroacetic anhydride, and the like, in place of acetic anhydride, the corresponding esters are obtained.

EXAMPLE 19

A mixture of 1 g. of the methyl ester of 2-(8'-methoxy-1',6'-oxidocyclodecapentaen-3'-yl)propionic acid and 20 ml. of anhydrous tetrahydrofuran is cooled to −78° C. in a dry ice-acetone bath and treated with a previously cooled solution of 0.6 g. of lithium aluminum hydride in 20 ml. of anhydrous tetrahydrofuran. The reaction mixture is warmed to room temperature and poured into ice water and extracted several times with ethyl acetate. The ethyl acetate extracts are combined, washed with water to neutrality, dried and evaporated to yield 2-(8'-methoxy-1',6'-oxidocyclodecapentaen-3'-yl)propanol.

Two grams of 2-(8'-methoxy-1',6'-oxidocyclodecapentaen-3'-yl)propionic acid in 20 ml. of diethyl ether is added to an ethereal solution of 1.2 molar equivalents of diazomethane. The resulting mixture is allowed to stand at 0° C. for about 1 hour and then is evaporated under reduced pressure to yield the methyl ester of 2-(8'-methoxy-1',6'-oxidocyclodecapentaen-3'-yl)propionic acid.

EXAMPLE 20

A mixture of 3 g. of the methyl ester of 2-(8'-methoxy-1',6'-oxidocyclodecapentaen-3'-yl)propionic acid, 1 g. of sodium methoxide, 1.5 g. of hydroxylamine hydrochloride and 50 ml. of methanol is allowed to stand for about 16 hours. The mixture is then filtered and the filtrate evaporated. The residue is neutralized by the addition of aqueous 1N hydrochloric acid and extracted with ether. The ether extracts are combined, washed with water, dried and evaporated to yield 2-(8'-methoxy-1',6'-oxidocyclodecapentaen-3'-yl)propionhydroxamic acid.

EXAMPLE 21

A mixture of 1 g. of 2-(8'-methoxy-1',6'-oxidocyclodecapentaen-3'-yl)propanol, 1 g. of sulfur trioxide trimethylamine complex and 40 ml. of pyridine is stirred at 40° C. for 2½ days. The mixture is then poured into about 200 ml. of saturated sodium bicarbonate solution and extracted with ethyl acetate followed by extraction with n-butanol. The n-butanol extracts are combined, dried over sodium sulfate and evaporated under reduced pressure to yield a residue which is taken up in methanol and stirred for about 10 minutes with a carboxylic acid ion-exchange resin (Amberlite IRC–50, acid cycle). The mixture is filtered and the filtrate evaporated under reduced pressure to yield 2-(8'-methoxy-1',6'-oxidocyclodecapentaen-3'-yl)propanol 2-sulfate monosodium salt.

EXAMPLE 22

A mixture of 2 g. of 2-(8'-methoxy-1',6'-oxidocyclodecapentaen-3'-yl)propanol and 2 molar equivalents of β-cyanoethyl phosphate in pyridine is combined with pyridine solution of 8 molar equivalents of N,N'-dicyclohexylcarbodiimide and the reaction mixture is allowed to stand at room temperature for 24 hours. The reaction mixture is diluted with a small amount of water and allowed to stand at about 5° C. for 2 days. The mixture is then evaporated to dryness under reduced pressure and the residue taken up in about 35 ml. of aqueous methanol (1:1). This mixture is treated with about 12 ml. of 5 percent aqueous sodium hydroxide solution and after about 1 hour at room temperature, it is concentrated under reduced pressure, diluted with 30 ml. of aqueous methanol, concentrated and mixed with 75 ml. of water. This mixture is filtered and the filtrate is treated batchwise and then columnwise with an excess of a sulfonic acid ion-exchange resin (H⁺ form) to yield 2-(8'-methoxy-1',6'-oxidocyclodecapentaen-3'-yl)propanol 2-phosphate.

EXAMPLE 23

To a solution of 1 g. of 1,6-oxidocyclodecapentaen-3-ylacetic acid in 25 ml. of ethanol, there is added with stirring an aqueous solution of a molar equivalent of potassium bicarbonate. This mixture is stirred until the evolution of carbon dioxide ceases and then the mixture is evaporated to furnish the potassium salt of 1,6-oxidocyclopentaen-3-ylacetic acid.

EXAMPLE 24

A mixture of 1 g. of the sodium salt of 1,6-oxido-8-methoxycyclodecapentaen-3-ylacetic acid, 3 ml. of methyl iodide and 20 ml. of dimethylacetamide is stirred in the dark for 5 hours. Excess methyl iodide is removed by evaporation under reduced pressure. The mixture is then poured into water and extracted several times with ether. The ether extracts are combined, washed, dried, and evaporated to give the methyl ester of 1,6-oxido-8-methoxycyclodecapentaen-3-ylacetic acid.

This methyl ester is alkylated according to the method of Example 8 to give the methyl ester of 2-(8'-methoxy-1',6'-oxidocyclodecapentaen-3'-yl)propionic acid which is hydrolyzed according to the method of Example 9 to yield 2-8'-methoxy-1',6'-oxidocyclodecapentaen-3'-yl)propionic acid

EXAMPLE 25

A mixture of 1 g. of the methyl ester of 2-(8'-methoxy-1',6'-oxidocyclodecapentaen-3'-yl)propionic acid, 50 ml. of tetrahydrofuran and a small molar excess of lithium aluminum hydride is allowed to stand at room temperature for about 4 hours. The reaction mixture is diluted with water and ethyl acetate. The organic layer is separated, washed, dried and evaporated to yield 2-(8'-methoxy-1',6'-oxidocyclodecapentaen-3'-yl)propanol.

By repeating the above procedure using the methyl ester of 2'-(1',6'-oxidocyclodecapentaen-3'-yl)propionic acid as the starting material, there is obtained 2-(1',6'-oxidocyclodecapentaen-3'-yl)propanol.

EXAMPLE 26

To a solution of 1 g. of 2-(8'-methoxy-1',6'-oxidocyclodecapentaen-3'-yl)propanol and 25 ml. of benzene there is added 2 ml. of 4'-methoxy-5',6'-dihydro-2H-pyran. About 5 ml. of the mixture is distilled off to remove moisture and the remaining mixture is then cooled to room temperature. To the cooled mixture is added 0.1 g. of p-toluenesulfonic acid and the resulting mixture held at room temperature for 72 hours. The reaction mixture is washed with aqueous 5 percent sodium carbonate solution and then with water until a neutral pH is obtained, then dried over sodium sulfate and evaporated to yield the 4''-methoxytetrahydropyran-4''-yl ether of 2-(8'-methoxy-1',6'-oxidocyclodecapentaen-3'-yl)propanol which can be purified by chromatography.

EXAMPLE 27

A solution of 1 g. of t-butyl perbenzoate and 100 mg. of cuprous acetate in 20 ml. of tetrahydrofuran is refluxed for 2 hours. To this solution is added 1.5 g. of 2-(8'-methoxy-1',6'-oxidocyclodecapentaen-3'-yl)propanol in 30 ml. of anhydrous benzene. The mixture is heated at reflux for about 6 hours, cooled to room temperature and then washed with aqueous sodium carbonate solution and then with water, dried and evaporated to yield the tetrahydrofuran-2''-yl ether of 2-(8'-methoxy-1',6'-oxidocyclodecapentaen-3'-yl)propanol.

By using tetrahydropyran in place of tetrahydrofuran, the corresponding tetrahydropyran-2''-yl ether is obtained.

What is claimed is:

1. A compound selected from those of the following formulas A and B:

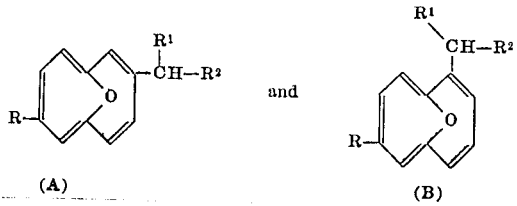

wherein,

R is hydrogen, lower alkyl, lower monocyclic alkyl, or lower alkoxy;

$R^1$ is hydrogen or lower alkyl of one to three carbon atoms; and $R^2$ is —CHO, —CH$_2$—R$^3$, —COOR$^4$, —CONH$_2$ or —CONHOH, in which $R^3$ is hydroxy or the hydrolyzable esters and ethers thereof and $R^4$ is hydrogen, lower alkyl or an alkali metal.

2. A compound according to claim 1 wherein R is hydrogen and $R^2$ is —COOR$^4$.

3. A compound according to claim 1 wherein R is hydrogen, $R^1$ is methyl and $R^2$ is —COOR$^4$.

4. A compound according to claim 1 wherein R is methoxy and $R^2$ is —COOR$^4$.

5. A compound according to claim 1 wherein R is methoxy, $R^1$ is methyl and $R^2$ is —COOR$^4$.

6. A compound according to claim 1 wherein $R^2$ is —CH$_2$-R$^3$, in which $R^3$ is hydroxy.

7. A compound according to Formula A of claim 1 wherein $R^2$ is —CH$_2$-R$^3$, in which $R^3$ is hydroxy.

8. A compound according to claim 7 wherein R is methoxy and $R^1$ is methyl.

9. A compound according to Formula A of claim 1 wherein $R^2$ is —COOR$^4$, in which $R^4$ is hydrogen.

10. A compound according to claim 9 wherein R is methoxy and $R^1$ is methyl.

* * * * *